(12) United States Patent
Finn et al.

(10) Patent No.: US 10,334,713 B2
(45) Date of Patent: Jun. 25, 2019

(54) DC TO DC ELECTRICAL TRANSFORMER

(71) Applicant: Tibbar Plasma Technologies, Inc., Los Alamos, NM (US)

(72) Inventors: John Finn, Los Alamos, NM (US); Richard Nebel, Los Alamos, NM (US); Keith Moser, Libertyville, IL (US); Liviu Popa-Simil, Los Alamos, NM (US); Cihan Akcay, Los Alamos, NM (US); Daniel Barnes, Lamy, NM (US); Juan Fernandez, Los Alamos, NM (US); William Gibson, Los Alamos, NM (US); Aaron McEvoy, Los Alamos, NM (US)

(73) Assignee: TIBBAR PLASMA TECHNOLOGIES, INC., Los Alamos, NM (US)

( * ) Notice: Subject to any disclaimer, the term of this patent is extended or adjusted under 35 U.S.C. 154(b) by 257 days.

(21) Appl. No.: 15/601,899

(22) Filed: May 22, 2017

(65) Prior Publication Data

US 2018/0338373 A1    Nov. 22, 2018

(51) Int. Cl.
*H05H 1/16* (2006.01)
*H02M 3/02* (2006.01)
(Continued)

(52) U.S. Cl.
CPC .............. *H05H 1/16* (2013.01); *H01F 27/29* (2013.01); *H02M 3/02* (2013.01); *H02M 3/24* (2013.01)

(58) Field of Classification Search
CPC ............ H02M 7/02; H02M 7/40; H02M 3/02; H02M 3/24; H01J 37/3266; H01J 37/32697; H02K 44/06; H05H 1/16; H01F 27/29
See application file for complete search history.

(56) References Cited

U.S. PATENT DOCUMENTS

| 3,530,334 A | 9/1970 | Thorpe et al. |
| 4,041,353 A | 8/1977 | Penfold et al. |

(Continued)

FOREIGN PATENT DOCUMENTS

| WO | 2006025626 A1 | 3/2006 |
| WO | 2008140928 A1 | 11/2008 |
| WO | 2014084963 A1 | 6/2014 |

OTHER PUBLICATIONS

Aydemir, A.Y. et al., "Compressibility as a feature of field reversal maintenance in the reversed-field pinch," Physics of Fluids, Mar. 1985, pp. 898-902, vol. 28, No. 3, AIP Publishing, USA.
(Continued)

*Primary Examiner* — Carlos Amaya
(74) *Attorney, Agent, or Firm* — Rod D. Baker (57) ABSTRACT

An electrical transformer system using helical electrodes applied to a plasma. Systems and methods transform DC voltages and currents to different DC voltages and currents. Instead of using wires and iron cores similar to known transformers, the present DC to DC transformer system exploits plasma, helical electrodes, an axial magnetic field and radial magnetic field coils, with a control system to specify a radial magnetic field at the edge of a specified magnitude. A DC input voltage is applied, and an output is taken from electrodes at opposite the ends of the central apparatus. The system and apparatus contains a radial magnetic field embedded in the helical electrodes; the secondary current is taken from either solid or split (slotted) electrodes. Methods are disclosed for changing the output voltage and current relative to the input values. The system can function as either a stepup or a stepdown transformer.

25 Claims, 9 Drawing Sheets

(51) Int. Cl.
*H01F 27/29* (2006.01)
*H02M 3/24* (2006.01)

(56) References Cited

U.S. PATENT DOCUMENTS

| | | | |
|---|---|---|---|
| 4,347,419 A | 8/1982 | Jasper, Jr. |
| 5,476,501 A | 12/1995 | Stewart et al. |
| 5,680,014 A | 10/1997 | Miyamoto et al. |
| 5,917,286 A | 6/1999 | Scholl et al. |
| 6,095,084 A | 8/2000 | Shamouilian et al. |
| 6,215,678 B1 | 4/2001 | Titus et al. |
| 6,396,213 B1 | 5/2002 | Koloc |
| 6,614,135 B1 | 9/2003 | Clapham |
| 6,781,087 B1 | 8/2004 | Chism, Jr. et al. |
| 7,232,985 B2 | 6/2007 | Monkhorst et al. |
| 7,411,353 B1 | 8/2008 | Rutberg et al. |
| 7,482,607 B2 | 1/2009 | Lerner et al. |
| 7,511,246 B2 | 3/2009 | Morrisroe |
| 7,741,577 B2 | 6/2010 | Kong et al. |
| 7,808,353 B1 | 10/2010 | Eskridge et al. |
| 8,031,824 B2 | 10/2011 | Bystriskii et al. |
| 8,289,512 B2 | 10/2012 | Morrisroe |
| 8,537,958 B2 | 9/2013 | Laberge et al. |
| 8,622,735 B2 | 1/2014 | Morrisroe |
| 8,878,434 B2 | 11/2014 | Gilbert |
| 9,028,656 B2 | 5/2015 | Koo et al. |
| 2004/0144314 A1 | 7/2004 | David et al. |
| 2010/0068887 A1 | 3/2010 | Harrington |
| 2010/0202580 A1 | 8/2010 | Park et al. |
| 2011/0272386 A1 | 11/2011 | Morrisroe |
| 2011/0273260 A1 | 11/2011 | Morrisroe |
| 2011/0315867 A1 | 12/2011 | Lane |
| 2015/0294842 A1 | 10/2015 | Nebel |
| 2017/0027048 A1 | 1/2017 | Nebel et al. |
| 2018/0124907 A1 | 5/2018 | Finn et al. |
| 2018/0124908 A1 | 5/2018 | Nebel et al. |
| 2018/0124909 A1 | 5/2018 | Moser et al. |

OTHER PUBLICATIONS

Schnack, D. C. et al., "Numerical simulation of reversed-field pinch dynamics," Computer Physics Comm., 1986, pp. 17-28, vol. 43, Amsterdam.

Moser, K. et al, "Three-Phase AC to DC Electrical Transformer," U.S. Appl. No. 15/602,298, filed May 23, 2017 (unpublished).

DC TO DC ELECTRICAL TRANSFORMER

STATEMENT REGARDING FEDERALLY SPONSORED RESEARCH OR DEVELOPMENT

This invention was made with Government support under Award No. DE-AR0000677, awarded by the Advanced Research Projects Agency—Energy (ARPA-E), U.S. Department of Energy. The Government has certain rights in this invention.

CROSS-REFERENCE TO RELATED APPLICATIONS

This application is related to U.S. patent application Ser. Nos. 14/648,014, 15/209,907, 15/336,508, 15/338,197, and 15/339,774, filed 28 May 2015, 14 Jul. 2016, 27 Oct. 2016, 28 Oct. 2016, and 31 Oct. 2016, respectively, and the entire disclosures thereof are hereby incorporated by reference.

BACKGROUND OF THE INVENTION

An electrical transformer based on helical electrodes applied to a plasma is described hereinafter. In previously disclosed devices (see U.S. patent application Ser. No. 14/648,014 by Nebel, and Ser. No. 15/336,508 by Finn et al.) a DC input voltage is applied to the helical electrodes and an output is taken from endcap electrodes at opposite the ends of the device. The presently disclosed apparatus also contains a radial magnetic field embedded in the helical electrodes and the secondary current is taken from solid or split (slotted) electrodes at the ends of the device. The system of the present disclosure also indicates methods for changing the output voltage and current relative to the input values. Thus, the present apparatus can function as either a stepup or a stepdown transformer. The system of the present disclosure can also be operated in reverse, with input voltage and current applied at the endcap electrodes and output voltage and current taken from the helical electrodes, thereby converting a stepup transformer to a stepdown transformer, and vice-versa. Although conventional methods can provide high voltage DC (HVDC) for long distance transmission, such methods are complex and costly. These and other shortcomings are addressed by the invention of the present disclosure.

SUMMARY OF THE INVENTIVE DISCLOSURE

It is to be understood that both the following summary and the following detailed description are exemplary and explanatory only and are not restrictive. Provided are methods and systems for, in one aspect, providing and managing DC power. Provided also are methods and systems for, in another aspect, transforming DC to DC power.

In an aspect of the apparatus and methods of this disclosure, systems and methods transform DC voltages and currents to DC voltages and currents, while minimizing cost and complexity. In another aspect, instead of using wires and iron cores similar to known AC to AC transformers, the DC to DC transformer systems of the present disclosure can comprise plasma, helical electrodes, an axial magnetic field and radial magnetic field coils with a control system to specify a radial magnetic field at the edge of a specified magnitude. As an example, the transformation of the DC voltages and currents can be based on magnetohydrodynamics (MHD) behavior.

In another aspect, an example system can comprise plasma disposed in a housing and two or more helical electrodes disposed in the housing, wherein an electric current passing through the two or more helical electrodes induces helical flow in the plasma. Conductive endcaps can be coupled to the housing and the helical electrodes.

In another aspect, an example system can comprise plasma disposed in a housing and two or more radial magnetic field coils with feedback circuitry to provide a specific value of the radial magnetic field disposed in the helical electrodes in the housing, wherein an electric current passing through the two or more helical electrodes directly drives current parallel to the magnetic field in the plasma. Conductive endcaps can be coupled to the housing and the helical electrodes.

In another aspect, a method can comprise generating a magnetic field through plasma and generating a helical flow in the plasma, thereby generating an electric current.

In another aspect, an example apparatus can comprise a chamber configured to contain plasma. The apparatus can comprise at least two input electrodes disposed at least partially within the chamber and configured to supply or convey a direct current into the chamber. The at least two input electrodes can be configured to direct the direct current to induce motion in the plasma. The apparatus can comprise at least two output endcap electrodes extending from the chamber. The at least two endcap electrodes can be configured to conduct a DC current from the chamber based on the induced motion in the plasma. If two or more output electrodes are used, DC current can be conducted from the chamber.

In another aspect, an example method can comprise conveying a first direct current into a chamber, inducing motion in a plasma contained in the chamber based on the direct current, driving parallel current directly in the plasma, because of or due to the radial magnetic field in the electrodes, and receiving a direct current from the chamber based on the induced motion of the plasma.

In another aspect, an example system can comprise a transformer with high efficiency by including applying a radial magnetic field. The purpose of this radial magnetic field is to drive directly current in the plasma substantially parallel to the magnetic field, in addition to the current driven due to the plasma helical flow induced by the applied electrostatic field from the helical electrodes.

In another aspect, the pitch of the helical electrodes may be varied to optimize the efficiency of the transformer, and to determine the ratio of the output voltage to the input voltage.

In another aspect, the length of the apparatus may be varied to optimize the efficiency of the transformer, and to determine the ratio of the output voltage to the input voltage.

In another aspect, the input and output leads of the apparatus may be reversed, so that the apparatus is driven by voltages applied to the endcap electrodes, and DC voltage and current may be taken off by the helical electrodes. The helical magnetic field coils and their control system remain in place to provide a specific radial magnetic field at the helical electrodes. In another aspect, the endcap electrodes serve as the primary of the transformer, and the helical electrodes serve as the secondary. This modification, to form the reciprocal apparatus functional configuration changes a stepup transformer to a stepdown transformer and vice-versa.

In another aspect, the magnitude of the feedback-controlled radial magnetic field may be varied to optimize the efficiency of the transformer.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, the scope of the invention being set forth in the claims and equivalents.

BRIEF DESCRIPTION OF THE DRAWINGS

The accompanying drawings, which are incorporated in and constitute a part of this specification, illustrate embodiments and together with the description, serve to explain the principles of the methods and systems.

The various views are not necessarily to scale, either within a particular view or between views.

DETAILED DESCRIPTION OF EMBODIMENTS

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Herein disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this disclosure including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following descriptions.

As will be appreciated by one skilled in the art, the methods and systems disclosed herein, and sub-methods and subsystems, may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software routines and algorithms. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It is understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

The computer program instructions according to this disclosure may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus, to produce a computer-implemented process such that the instructions that are executed on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and methods, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The systems and methods of the present disclosure generally involve inducing a helical flow in plasma, and exploiting the plasma flow to realize a current transformation or conversion. Flows can be induced in plasmas by applying an electric field perpendicular to the magnetic field. The ideal MHD Ohm's law can be written as:

$$E + V \times B = 0, \quad (1)$$

where E is the local electric field, V is the local plasma velocity, and B is the local magnetic field, and x signifies the vector cross product. Bold face indicates quantities which are vectors.

If equation (1) is crossed with the magnetic field B, it can be determined that the plasma flow perpendicular to the magnetic field (denoted as $V_{E \times B}$ and commonly referred to as the E×B drift velocity) becomes, in the ideal MHD limit:

$$V_{E \times B} = (E \times B)/B^2, \quad (2)$$

where x signifies the vector cross product and $B^2$ is the vector dot product of B with itself.

In order for the E×B drift velocity to change the magnetic field significantly it must be comparable to the Alfven speed ($V_A$) which can be expressed as:

$$V_A = B/(\mu_0 \rho)^{1/2}, \quad (3)$$

where B is the magnitude of the magnetic field, p is the mass per unit volume, and to is the permittivity of free space. Equation (1) can be combined with Faraday's law:

$$\partial B/\partial t = -\text{curl}(E) \quad (4)$$

and integrated over a surface. As such, the result calculation provides that the magnetic field lines (or the magnetic flux) are substantially frozen into the plasma in ideal MHD. As an example, the magnetic field lines convect with the plasma.

When plasma velocities approach the Alfven speed ($V_A$) the plasma velocities can bend the magnetic field lines. Thus, if a velocity shear is induced in the perpendicular velocity (e.g., the $V_{E \times B}$ drift velocity), the magnetic field can be significantly modified, provided that the flow speeds are near the magnitude of the Alfven speed $V_A$.

Three-dimensional nonlinear resistive MHD plasma simulations can be used to confirm aspects of the phenomenon described herein above. As an example, a simulation code similar to that implemented in A. Y. Aydemir, D. C. Barnes, E. J. Caramana, A. A. Mirin, R. A. Nebel, D. D. Schnack, A. G. Sgro, *Phys Fluids* 28, 898 (1985) and D. D. Schnack, D. C. Barnes, Z. Mikic, D. S. Harned, E. J. Caramana, R. A. Nebel, *Computer Phys Comm* 43, 17 (1986), can be used. As a further example, plasma can be simulated in cylindrical geometry.

In an aspect of the present system and method, an axial magnetic field can be applied along with a helical electric field (the latter, e.g., provided via a pair of helical electrodes on the boundary) as well as a magnetic field with a radial component through the helical electrodes. This radial magnetic field component may appear spontaneously but can be controlled by external coils whose current is controlled by a feedback circuit.

Figure 1:
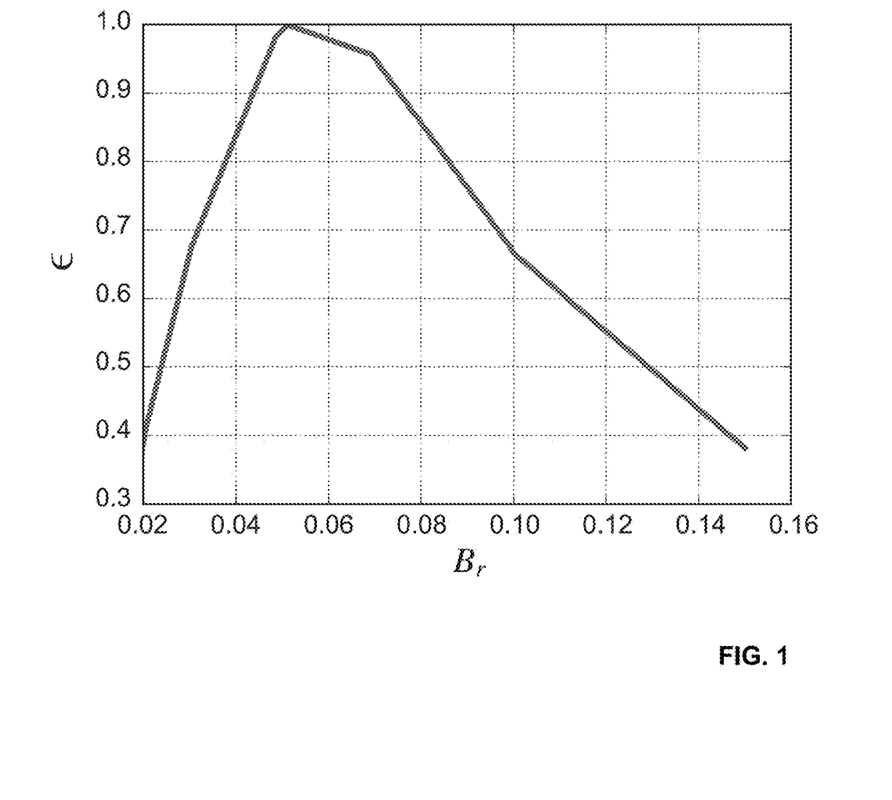
FIG. 1 is a plot from 3D magnetohydrodynamic simulations showing the transformer efficiency, relative to its maximum value, versus radial magnetic field $B_r$.

Three-dimensional resistive MHD simulations show that the magnetic field lies on surfaces with helical distortion supplied by the helical electrode current, and by the radial magnetic field penetrating the helical electrodes; for small radial magnetic field the current density $J_z$ can have both signs, and split or slotted endcap electrodes, with insulators in the gaps, connected as in co-pending U.S. patent application Ser. No. 15/336,508, entitled "DC-DC Electrical Transformer," may be used to harvest the current at peak efficiency. The configuration and makeup of split or slotted endcap electrodes are disclosed in co-pending U.S. patent application Ser. No. 15/336,508 and in co-pending U.S. patent application Ser. No. 15/339,774, entitled "Three Phase Alternating Current to Three Phase Alternating Current Electrical Transformer," both of which are here expressly incorporated by reference. For larger radial magnetic field, simulations show that the current density $J_z$ is of a single sign, allowing solid electrodes as disclosed in U.S. patent application Ser. No. 14/648,014. The radial magnetic field will grow on the resistive time of the helical electrodes. The optimum value for the radial magnetic field in this disclosure is provided by a control circuit, limiting the radial magnetic field to the optimal value. Three-dimensional resistive MHD simulations show that the efficiency peaks at a specific value of the radial magnetic field. For example, the efficiency as a function of the radial magnetic field $B_r$ is shown in FIG. 1, depicting a peak at an intermediate value. These simulations also show that to obtain favorable values for the efficiency, this peak in efficiency must be optimized with respect to the back EMF of the secondary circuit, the voltage on the primary circuit, the pitch of the helical electrodes, the length of the device, and the plasma temperature.

Figure 2:
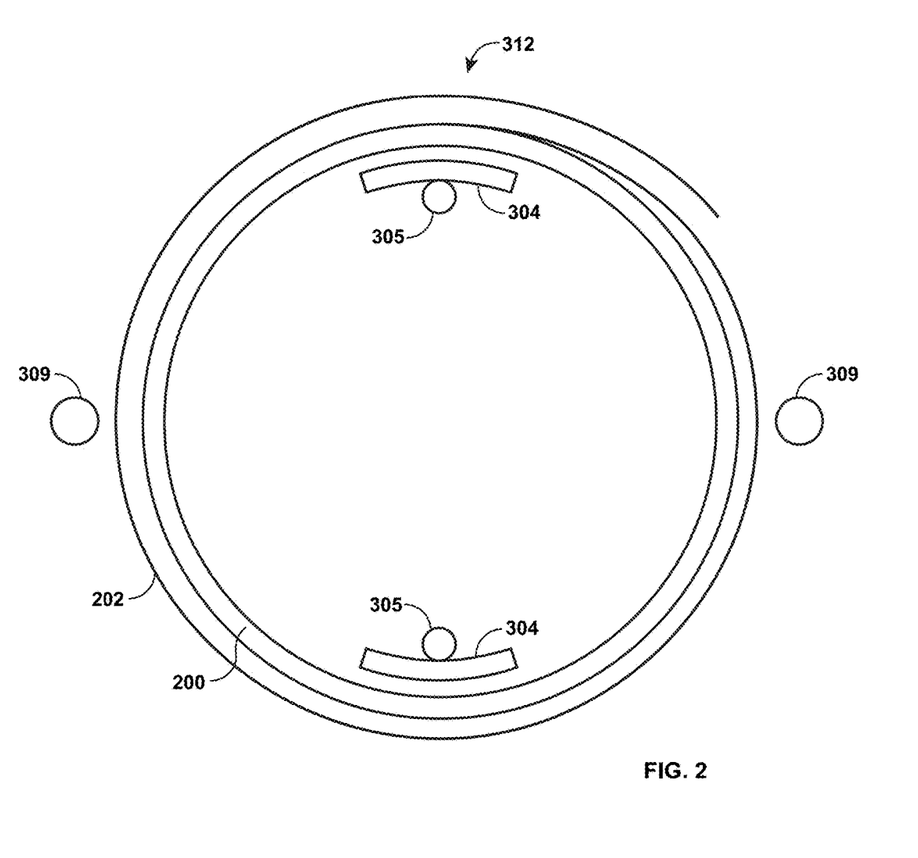
FIG. 2 is a diagrammatic cross sectional view of the DC to DC transformer.

FIG. 2 is a sectional view of the DC to DC transformer 312, with two helical electrodes 304, helical electrode leads 305, a vacuum vessel 200, solenoidal magnetic coils 202 for the axial magnetic field, and helical feedback coils 309 for controlling the value of the radial magnetic field on the helical electrodes.

Figure 3:
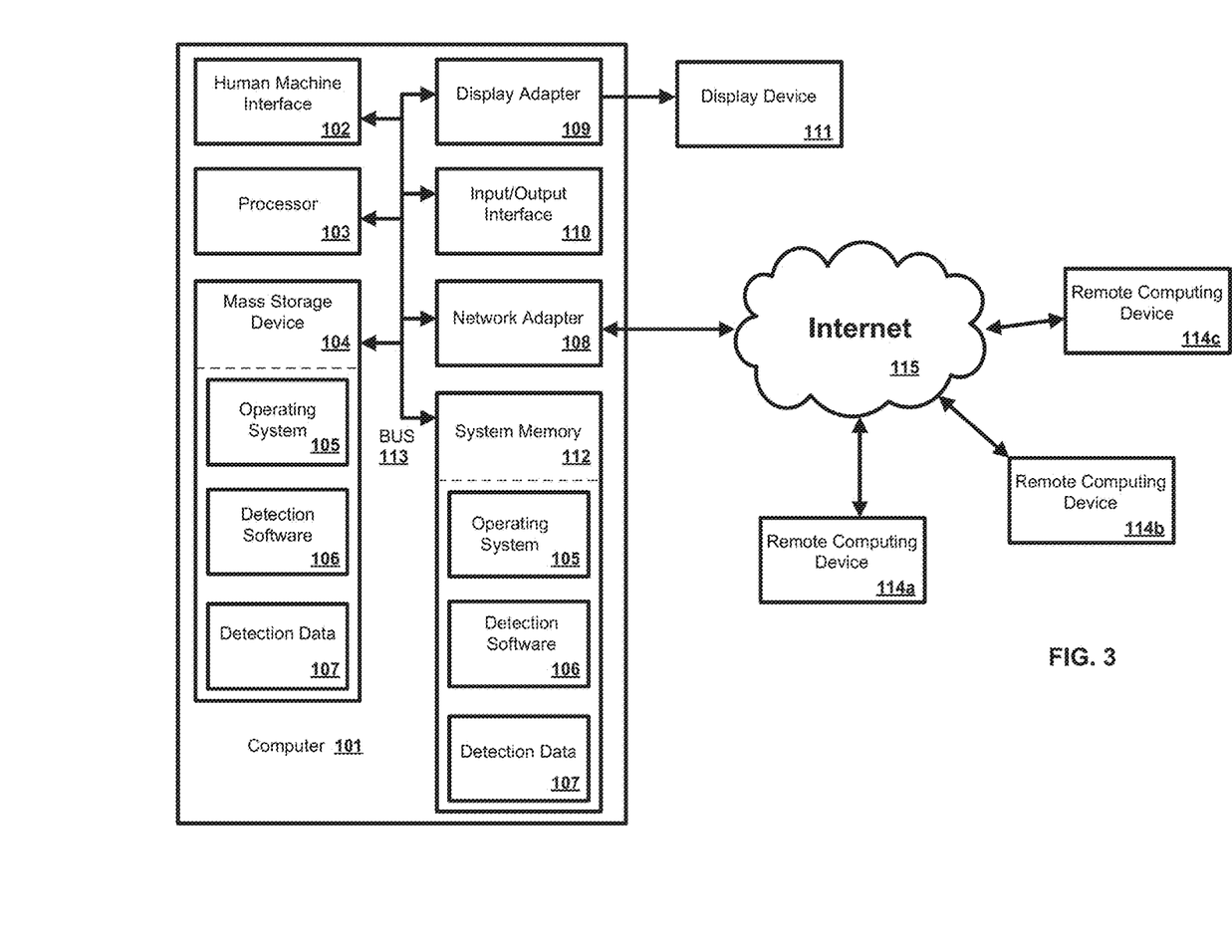
FIG. 3 is a block diagram of an exemplary computing system and method in accordance with the present disclosure.

FIG. 3 is a block diagram illustrating an exemplary operating environment for performing the disclosed methods. This exemplary operating environment is only an example of an operating environment, and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, dynamos, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

With attention invited to FIG. 3, one skilled in the art will appreciate that the systems and methods disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 113, and all buses specified in this description can also be implemented over a wired or wireless network connection and each of the subsystems, including the processing unit 103, a mass storage device 104, an operating system 105, detection software 106, detection data 107, a network adapter 108, system memory 112, an Input/Output Interface 110, a display adapter 109, a display device 111, and a human-machine interface 102, can be contained within one or more remote computing devices 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as detection data 107 and/or program modules such as operating system 105 and detection software 106 that are immediately accessible to and/or are presently operated on by the processing unit 103.

The computer 101 may also comprise other removable/non-removable, volatile/non-volatile computer storage media. By way of example, FIG. 3 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and detection software 106. Each of the operating system 105 and detection software 106 (or some combination thereof) can comprise elements of the programming and the detection software 106. Detection data 107 can also be stored on the mass storage device 104. Detection data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

A user can enter commands and information into the computer 101 via an input device (not shown). Examples of known such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 103 via a human-machine interface 102 that is coupled to the system bus 113, but can be connected by other interface and bus structures, such as a parallel port, game port, an IEEE 1394 Port (also known as a Firewire™ port), a serial port, or a universal serial bus (USB).

A display device 111 can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110. Any step and/or result of the methods can be output in any form to an output device. Such output can be any form of visual representation, including, but not limited to, textual, graphical, animation, audio, tactile, and the like.

The computer 101 can operate in a networked environment using logical connections to one or more remote computing devices 114a, b, c. By way of example, a remote computing device can be a personal computer, portable computer, a server, a router, a network computer, a peer device or other common network node, and so on. Logical connections between the computer 101 and a remote computing device 114a, b, c can be made via a local area network (LAN) and a general wide area network (WAN). Such network connections can be through a network adapter 108.

A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein, particularly with reference to FIG. 3, as discrete blocks, although it is recognized that such programs and components reside at various times in different storage components of the computing device 101, and are executed by the data processor(s) of the computer. An implementation of simulation detection software 106 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 4:
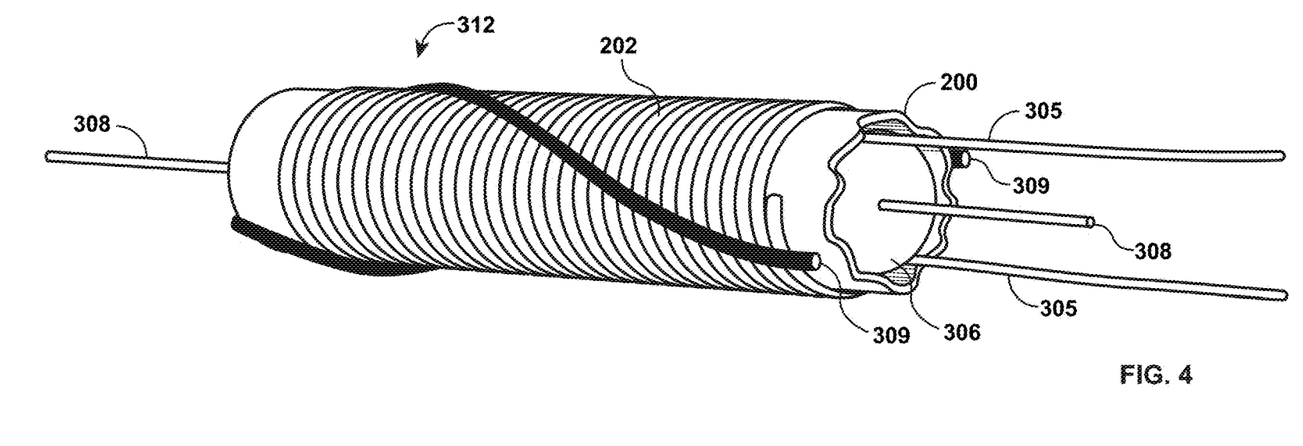
FIG. 4 is a perspective view of an exemplary transformer system according to the present invention.

FIG. 4 illustrates the DC-DC transformer system 312 according to the present disclosure. There is a vacuum chamber 200 configured to contain a plasma; plasma (not shown) can be disposed in the chamber. As an example, a conductor 202 (e.g., wire) is disposed around a periphery of the housing forming the vacuum chamber 200. As a further example, wire conductor 202 can be wound about the chamber 200 to define a solenoid that provides an axial magnetic field when current flows through the conductor 202. Accordingly, the solenoid is disposed around at least a portion of an external wall of the chamber 200; electric current passing through the conductor 202 constituting the solenoid induces a magnetic field within the chamber 200 in an axial direction of the solenoid. There are provided at least two helical electrodes (not seen in FIG. 4; element 304 In FIG. 2 and also in FIG. 5B) connected to helical electrode leads 305 (nominally, the input leads) disposed at least partially within the chamber 200, and configured to convey a direct current into the chamber. The radial field at the helical electrodes develops by means of the helical perturbation provided by the helical electrodes causing to diffuse through the electrodes. There are provided, preferably exterior to the chamber 200, at least two helical coils 309 for radial magnetic field feedback to regulate to a specified radial magnetic field at the helical electrodes 304. For two solid endcap electrodes (e.g., electrode 306 shown in FIG. 4) there are at least two leads 308, i.e., a corresponding lead connected to each respective electrode 306; for a single slotted or split endcap electrode there are at least two electrode leads 308 connected to the same, single, split endcap electrode; when both endcap electrodes are split, there are at least four electrode leads, two connected to each respective endcap electrode.

Figure 5A:
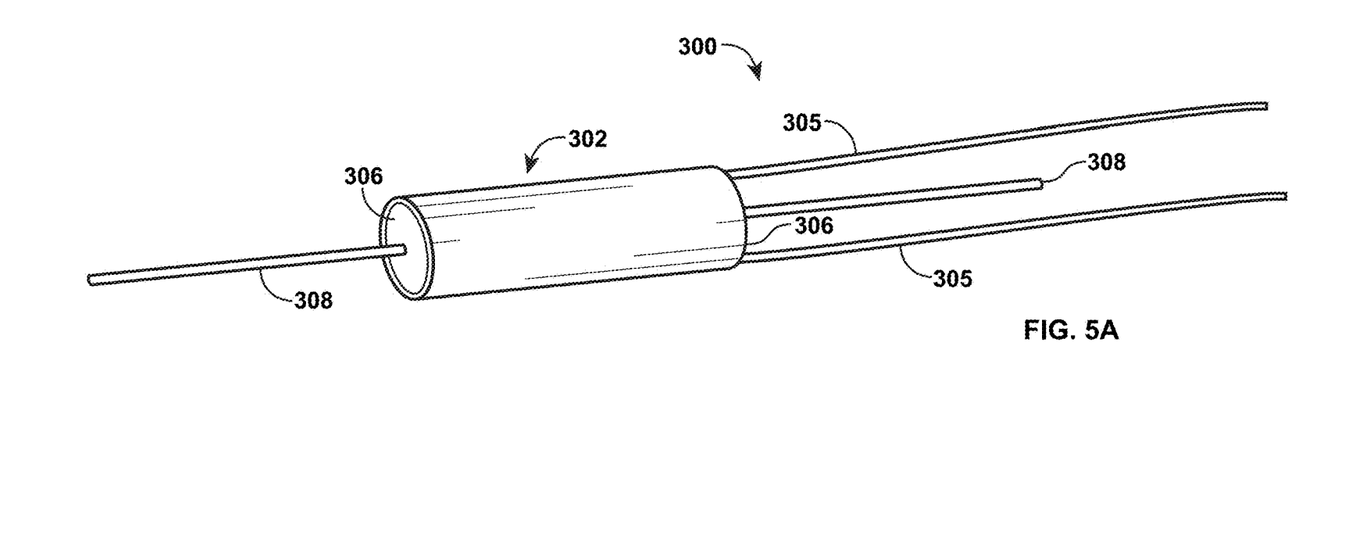
FIG. 5A is a perspective view of a DC to DC transformer according to the present disclosure with solenoidal and helical magnetic coils removed.
Figure 5B:
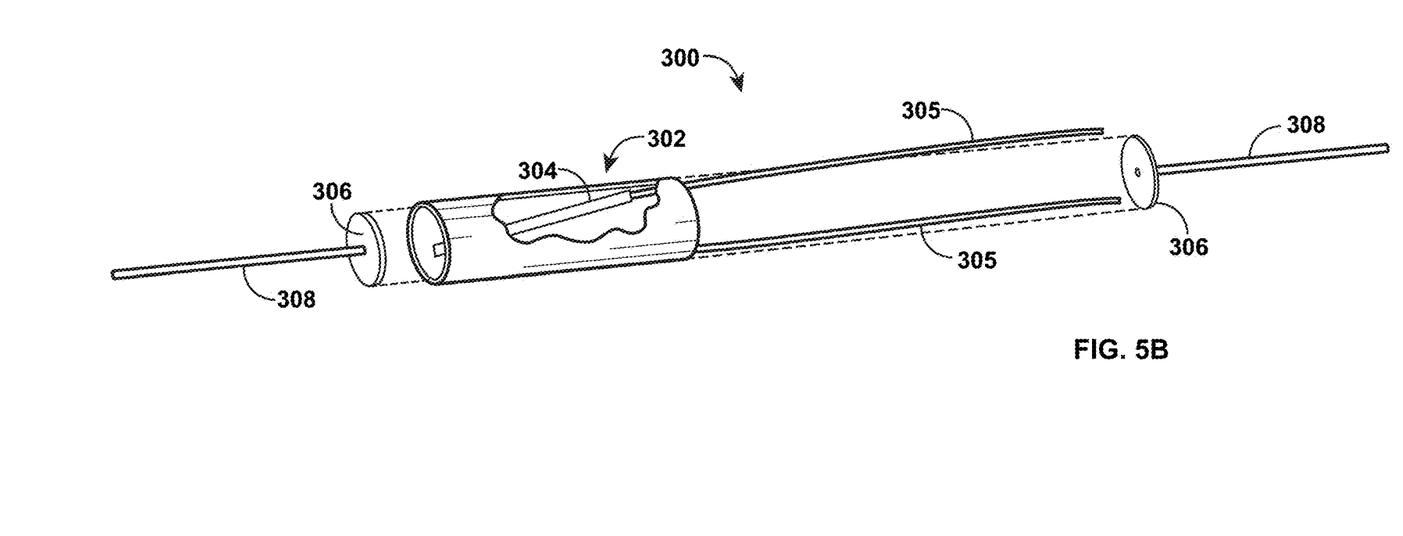
FIG. 5B is an a perspective view of a DC to DC transformer such as seen in FIG. 5A, exploded axially and with a portion of the housing cutaway to show the helical electrodes.

In a preferred embodiment of the transformer insert 300 shown in FIG. 5A, the input electrodes are helical electrodes 304 which are in signal communication with the helical electrode leads 305, while the nominal output electrodes are endcaps 306 transmitting to their associated endcap leads 308. It is immediately understood, however, that when the transformer is operated in the reciprocal manner the helical electrodes 304 serve as output electrodes, and the endcaps 306 serve as inputs. Each of the at least two helical electrodes 304 preferably comprises at least one helically shaped portion (that is, a portion defining a segment of a geometric helix). Each magnetic coil 309 also preferably comprises at least one helically shaped portion.

FIG. 5A shows a perspective view of the insert 300 for the DC to DC transformer, with electrically insulating insert housing 302. The insert 300 is shown with selected components expanded axially in the exploded view of FIG. 5B. The helical electrodes 304 are fitted inside the insulating insert housing 302, and are equally spaced around the chamber circumference; e.g., two helical electrodes are separated (i.e., offset circumferentially) from one another by 180 degrees, and are connected to helical electrode leads 305. At least two magnetic coils 309 for controlling the radial magnetic field are situated outside the solenoidal coils (see FIG. 4), and are spaced in angle between the helical electrodes 304, and controlled by a feedback system. The endcaps 306 are connected to endcap leads 308.

Figure 6:
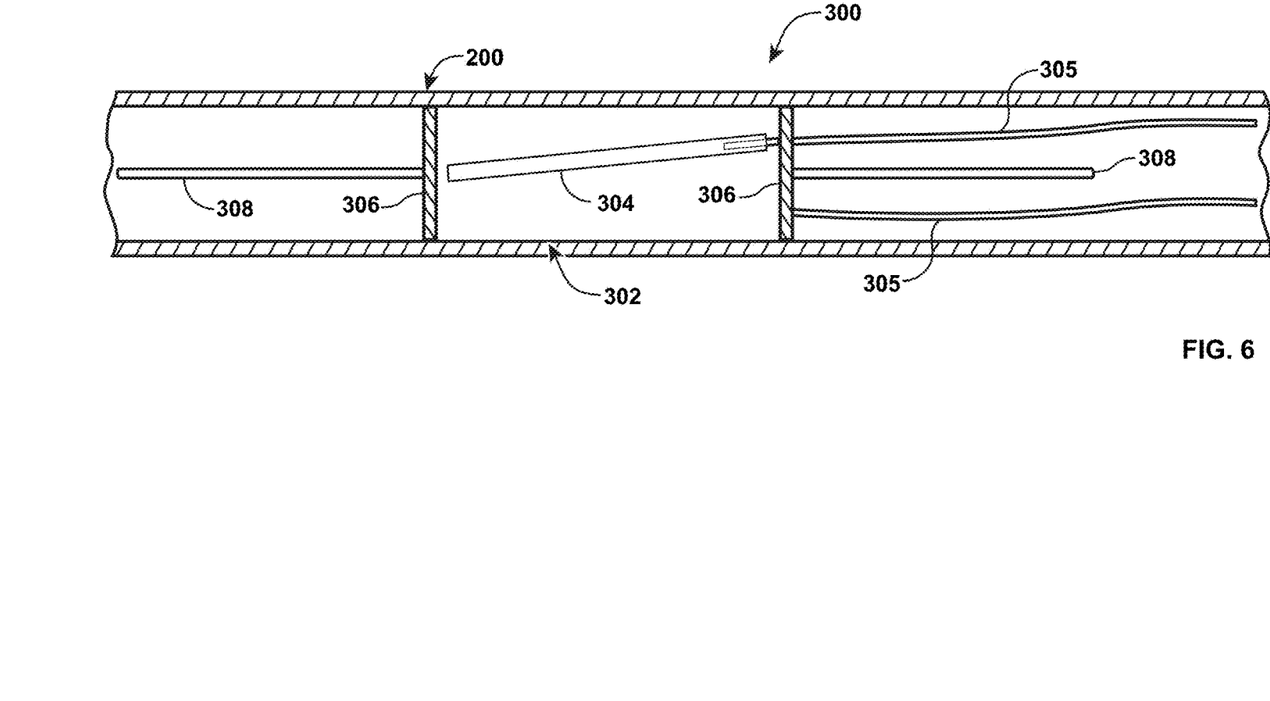
FIG. 6 is an axial sectional view diagramming the DC to DC transformer.

FIG. 6 is a cross sectional diagram of the DC to DC transformer insert 300, showing the vacuum vessel 200 (but for the sake of simplicity of depiction not showing the exterior solenoidal coils or feedback coils). One of the two helical electrodes 304, as well as the helical electrode leads 305, are shown. The endcap electrodes 306 and their associated leads 308 are also shown.

Figure 7A:
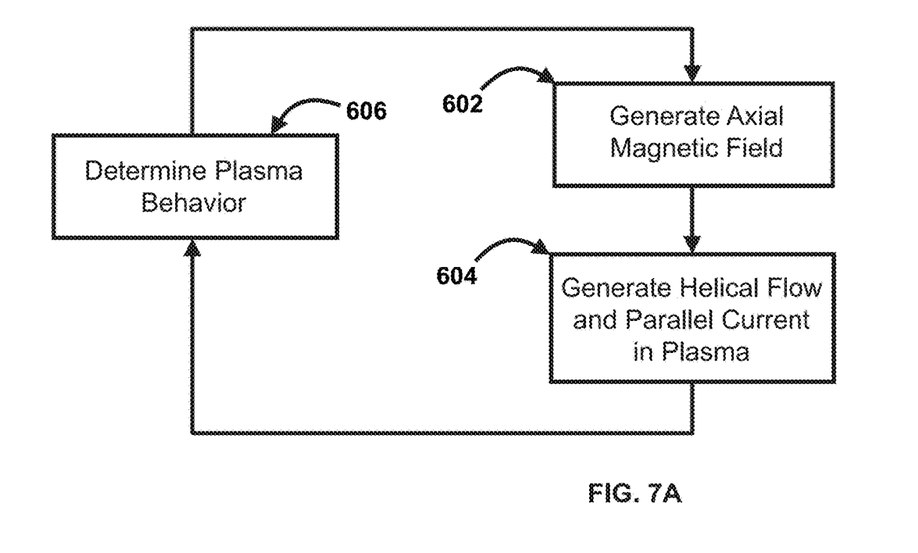
FIG. 7A is a flow diagram of an exemplary method of controlling the plasma by the solenoidal coils, providing the axial magnetic field.

The flowchart of FIG. 7A illustrates for DC to DC operation that the method according to this disclosure may comprise generating a substantially uniform axial magnetic field through a plasma (first step 602) and generating a helical flow in the plasma (step 604), thereby generating an electric current. The uniform axial magnetic field (per method second step 602) can be generated by a solenoid assembly 202 (FIG. 4). As an example, the solenoid assembly can be disposed around the plasma, such as a solenoid housing. In an aspect of this system, the helical flow driven by the helical electrodes 304 can be sheared in an axial direction relative to the plasma, and the current is generated in the axial direction. A drift speed of the plasma is a factor (e.g., fraction or multiple) of the Alfven speed. For example, the drift speed of the plasma can be between about 0.01 and about 400 times the Alfven speed. As a further example, the drift speed can be between about 0.01 and about 2 times the Alfven speed, between about 0.01 and about 10 times the Alfven speed, between about 0.01 and about 100 times the Alfven speed, between about 0.01 and about 200 times, or between about 0.01 and about 300 times the Alfven speed. Other ranges of factors can result from the systems and methods of the present disclosure. In another aspect, generating a helical flow in the plasma comprises generating one or more of a partial laminar flow and a turbulent flow in the plasma. In a further aspect, plasma behavior can be determined (e.g., estimated, simulated) using an MHD simulation (third step 606 in FIG. 7A). Accordingly, the magnetic field and therefore the helical flow generated can be configured and controlled based on the MHD simulation.

Figure 7B:
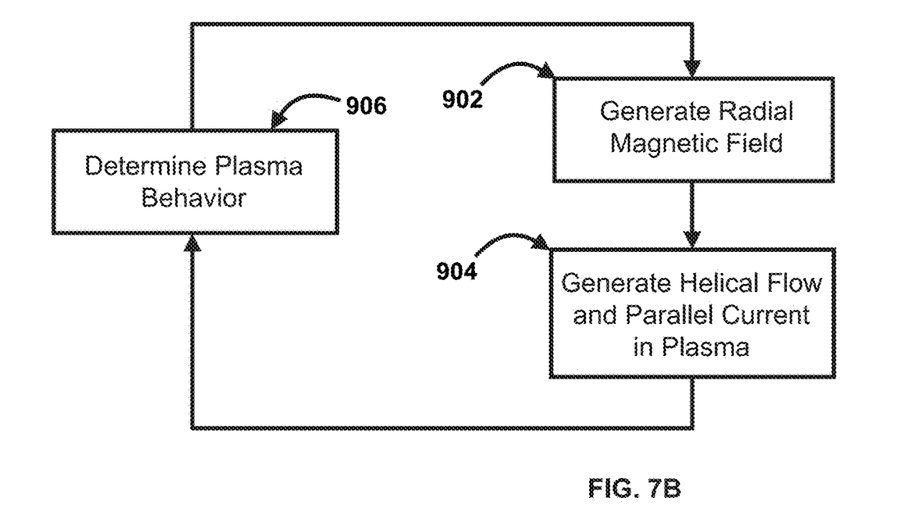
FIG. 7B is a flow diagram of an exemplary method of controlling the plasma by the helical coils, providing the radial magnetic field.

The flowchart of FIG. 7B illustrates the method of controlling the radial magnetic field for the DC to DC transformer. The feedback coils 309 generate the radial magnetic field (first step 902), and this field plus the voltage on the helical electrodes 304 determine the helical plasma flow in the chamber and the parallel plasma current driven directly from the electrodes (per method second step 904). The plasma behavior, including the value of the radial magnetic field on the helical electrodes, is determined (third method step 906) and used by the feedback system to modify the current in the feedback coils 309 and therefore the radial field on the helical electrodes 304.

Figure 8:
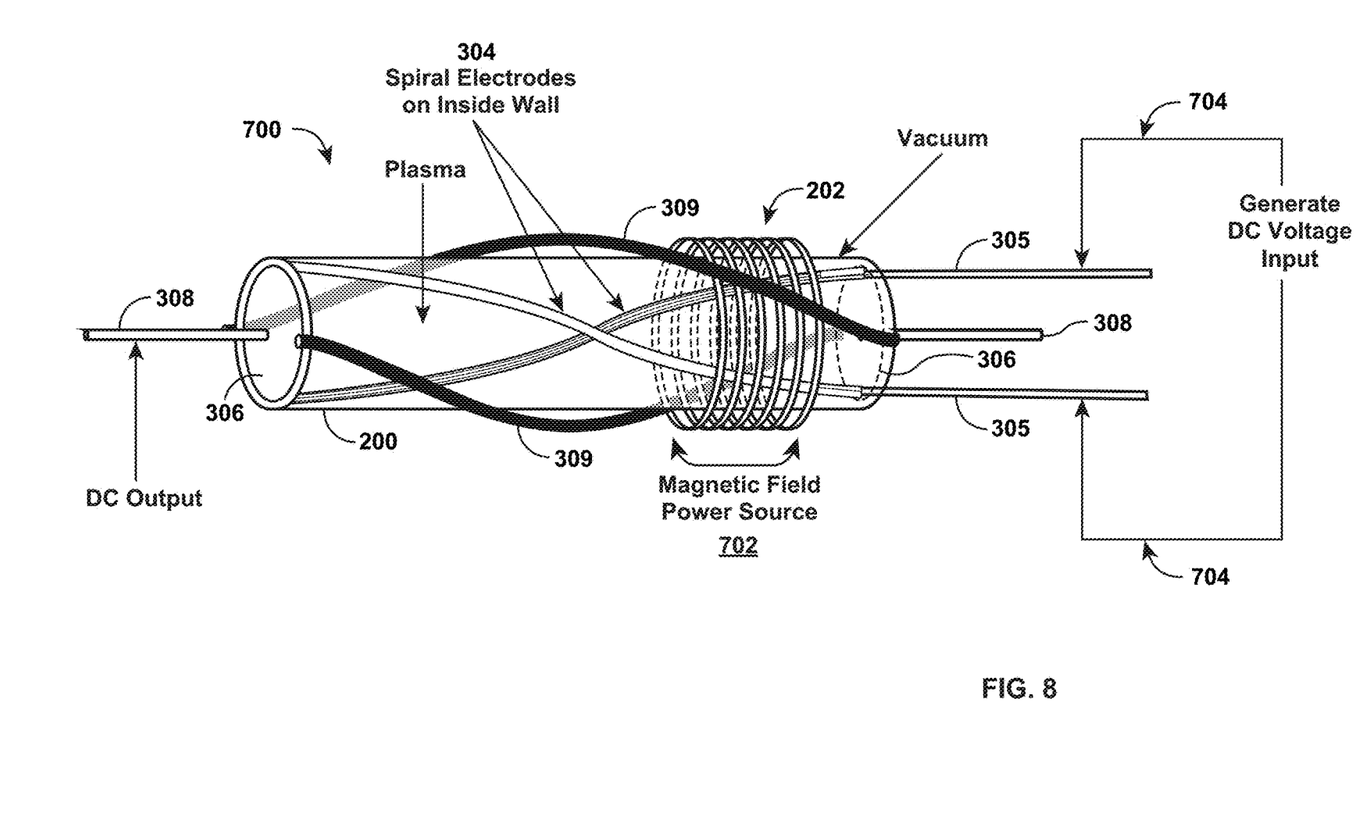
FIG. 8 is a schematic diagram of the DC to DC transformer, illustrating its connection to external circuits.

FIG. 8 is a schematic of the overall system and context of a DC to DC transformer 700 according to the present disclosure. The externally supplied magnetic field is from a magnetic field power source 702 having coils wound around a vacuum chamber 200 (e.g., chamber 200 of FIG. 4). The spiral or helical electrodes 304 (e.g., electrodes 304 in FIGS. 2, 5 and 6) supply the DC voltage 704 to ionize the gas thereby (in a preferred embodiment) to generate the plasma contained within the tube chamber 200, and provide a helical current with components parallel and perpendicular to the magnetic field supplied from source 702. The DC output voltage and current is conveyed through the endcap leads 308 from the endcap electrodes 306, for transmission to a remote place of use.

The external helical magnetic coils 309 control the radial magnetic field through the helical electrodes 304, allowing parallel current to be driven in the plasma directly. The helical magnetic coils 309 are controlled by a feedback circuit, to provide a specified radial magnetic field through the helical electrodes. The reciprocal device, in which the transformer primary and secondary are exchanged, can be operated by applying DC voltage to endcap leads 308 and taking DC output from helical electrode leads 305. The solenoidal coils and the helical coils, the latter controlled by feedback, operate in the same manner for the reciprocal transformer.

The system 700 can be integrated into and/or implemented in a variety of devices, systems, and/or applications, such as a commercial buildings, homes, factories and the like.

Combined reference is made to FIGS. 4-6 and 8. Thus there has been disclosed a system comprising a transformer configured to transform a first direct current to a second direct current. In a preferred embodiment, the transformer comprises a chamber 200 or insert 300, configured to contain plasma, at least two helical electrodes 304 disposed at least partially within the chamber 200 or insert 300 and configured to direct the direct current to induce motion in the plasma, thereby generating the direct current in the secondary (e.g., including at least two endcap electrodes 306 extending from the chamber and configured to conduct the direct current from the chamber, and an electrical delivery network (including, e.g., endcap leads 308) electrically coupled to the at least two endcap electrodes and configured to conduct the direct current to at least one remote location.

The chamber 200 preferably includes endcap electrodes 306 at opposite ends of the chamber, and wherein the electrode 306 conveys direct current from the chamber through the endcap leads 308. The at least two helical electrodes for DC to DC include at least two sets of paired electrodes equally spaced around the chamber. The at least two magnetic feedback coils include at least two sets of paired coils equally spaced around the chamber.

In a preferred embodiment, the transformer assembly further includes a solenoid disposed around at least a portion of an external wall of the chamber 200, and an electric current passing through the solenoid induces a magnetic field within the chamber in an axial direction of the solenoid. Induced the motion in the plasma distorts the magnetic field, producing axial direct current within the chamber. In addition the radial magnetic field allows plasma current parallel to the magnetic field to flow into the chamber. The coil 309 connected to a control system specifies the value of the radial magnetic field in the helical electrode.

Figure 9:
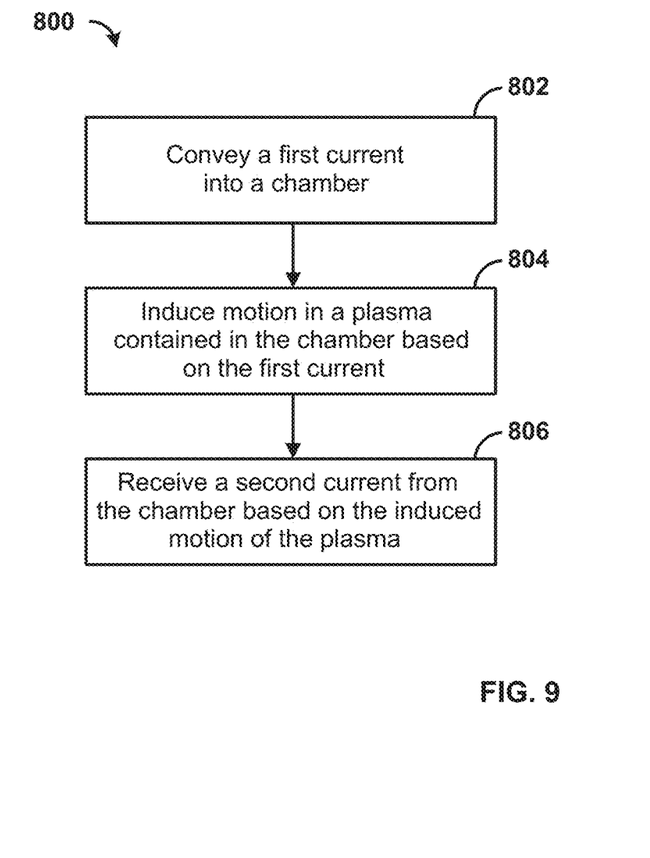
FIG. 9 is a flow chart illustrating a function of the transformer for converting a voltage and/or an electrical current.

Attention is advanced to FIG. 9, providing a flow chart illustrating an example method 800 for transforming and/or converting a voltage and/or an electrical current. At step 802, a first current can be conveyed (e.g., provided, carried, transported, channeled) into a chamber. The first current can comprise a direct current. The first current can comprise a first voltage. For example, the first current can be conveyed to the chamber from a component of a power plant, power station, power line, and/or the like. The first current can be conveyed into the chamber via two or more electrodes (e.g., two, four, six, eight). The two or more electrodes can be disposed at least partially within the chamber. For example, the two or more electrodes can each comprise a first portion extending outside of the chamber and a second portion within the chamber. The first current can be through helical electrodes. A second current passes through the helical magnetic coils to provide the radial magnetic field at the plasma edge.

The chamber may contain a gas, plasma, and/or the like. For example, the chamber can be filled with a gas, such as argon or hydrogen. The gas can be converted to plasma before, at the time of, or after the first current is conveyed to the chamber. The plasma and/or gas can be filled to a specified pressure (e.g., 1 mtorr) to achieve a desired behavior (e.g., motion or current) of the plasma and/or gas. The chamber can be configured (e.g., shaped) to cause, direct, constrain, control, and/or the like motion of the plasma within the chamber. For example, the chamber can be cylindrically shaped.

According to the system and method, a magnetic field can be generated through the plasma. For example, a wire proximate to the chamber can generate a magnetic field. The wire, which may define a solenoid, can be disposed (e.g., wrapped) around an exterior wall of the chamber. In an aspect, a protective layer (e.g., cover, shroud) can be disposed in between the wire and the chamber, as suggested by FIG. 4.

At second step 804 of FIG. 9, motion can be induced in a plasma contained within the chamber based on the first current. For example, the first current can generate a second magnetic field within the chamber. The second magnetic field can be based on the path of the first current. For example, the two or more electrodes can be disposed, shaped, or the like, to generate an electric field between at least two of the one or more electrodes. In an aspect, the electric field can be a helically symmetric electric field. For example, the electric field can be rotated along the axis of the chamber. The electric field can cause, at least in part, the second current and/or the second voltage to be generated within the chamber. A distinct part of the current in the plasma is directly driven parallel to the magnetic field because of the radial magnetic field in the primary electrodes.

Inducing the motion in the plasma can distort the magnetic field, thereby inducing a second current within the chamber. Inducing motion in the plasma can comprise providing the first current through at least one helical electrode within the chamber. The induced motion can comprise helical flow sheared in an axial direction relative to the plasma. Induced motion can comprise a helical flow in the plasma. The induced motion may comprise a turbulent flow, a laminar flow, or a combination thereof. For example, the motion can be along a first direction at the center of the chamber. The motion can be along a second direction along interior walls of the chamber. The second direction can be opposite the first direction. The first direction and the second direction can be directions along (e.g., parallel to) the axis of the chamber.

At third step 806, the second current can be received from the chamber based on the induced motion of the plasma. The second current can comprise a DC current. As an illustration, the first current can comprise a direct current and the second current can comprise a direct current.

The second current can be generated in an axial direction (e.g., along an axis or length of the chamber). For example, the second current can be generated along a line extending from a top (e.g., top cap) of the chamber to a bottom (e.g., bottom cap) of the chamber.

Furthermore, the first current can be conveyed with a first voltage. The second current can be conveyed with a second voltage. The second voltage can be a high voltage or low voltage in comparison to the first voltage. For example, the second voltage can be X (e.g., 1 2, 3, 4, 5, etc.) orders of magnitude greater or less than the first voltage.

Thus there also has been disclosed herein a method comprising the basic steps of (a) conveying a direct current into a chamber; (b) inducing motion or directly driving current parallel to the magnetic field in a plasma contained in the chamber based on the direct current; and (c) receiving a direct current from the chamber based on the induced motion of the plasma. The method preferably further comprises the step of generating a magnetic field through the plasma, and wherein inducing the motion in the plasma distorts the magnetic field, thereby effectuating a step of inducing the direct current within the chamber. The step of inducing motion in the plasma preferably comprises providing the direct current through at least two helical electrodes within the chamber. Also, inducing motion may comprise inducing a helical flow sheared in an axial direction relative to the plasma, and wherein generating the direct current comprises generating current in the axial direction.

The step of conveying a direct current preferably comprises conveying with a first voltage, and further comprising a step of conveying the direct current with a second voltage. Also in the method, a solid or slotted endcap electrode preferably converts the axial currents in the chamber to a direct current. Multiple pairs of primary electrodes may be connected through an external rotor, and the primary electrodes convert axial currents in the chamber to a direct current. The step of inducing motion preferably comprises generating a turbulent flow, a laminar flow, or a combination thereof. Also, inducing motion may comprise inducing a helical flow in the plasma.

The foregoing examples are offered so as to provide those of ordinary skill in the art with a further disclosure and description of how the compounds, compositions, articles, devices and/or methods claimed herein are made and evaluated, and are intended to be purely exemplary and are not intended to limit the scope of the methods and systems. Efforts have been made to ensure accuracy with respect to numbers (e.g., amounts, temperature, etc.), but some errors and deviations should be accounted for. Unless indicated otherwise, parts are parts by weight, temperature is in degrees centigrade (° C.) or is at ambient temperature, and pressure is at or near atmospheric.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This is true for any possible non-express basis for interpretation, including: matters of logic with respect to arrangement of steps or operational flow; plain meaning derived from grammatical organization or punctuation; the number or type of embodiments described in the specification.

Various publications are referenced herein above. The disclosures of these publications in their entireties are hereby incorporated by reference into this application in order to more characterize the state of the art to which the methods and systems pertain.

It will be apparent to those skilled in the art that various modifications and variations can be made without departing from the scope or spirit of the disclosed invention. Other embodiments will be apparent to those skilled in the art from consideration of the specification and practice disclosed herein. It is intended that the specification and examples be considered as exemplary only, with the scope of the invention being defined by the claims appended hereto.

What is claimed is:

1. An apparatus comprising:
a chamber configured to contain plasma;
at least two helical input electrodes disposed at least partially within the chamber and configured to receive a first direct current into the chamber, wherein the at least two input electrodes are configured to direct the first direct current to induce motion in the plasma, thereby to transform the first direct current;
at least two helical magnetic coils external to the chamber and configured to control a radial magnetic field through the helical input electrodes; and
at least two output electrodes extending from the chamber, wherein the at least two output electrodes are configured to conduct a second direct current from the chamber based on the induced motion in the plasma.

2. The apparatus of claim 1, wherein the at least two input electrodes are equally spaced around the chamber.

3. The apparatus of claim 1, wherein the at least two output electrodes comprised of a solid end cap electrode disposed at a first end of the chamber and a split electrode disposed at an other end of the chamber, and further comprising at least two output leads wherein all output leads of the at least two output electrodes are disposed through the split electrode.

4. The apparatus of claim 1, wherein the at least two output electrodes comprise a first split electrode disposed at a first end of the chamber and a second split electrode disposed at an other end of the chamber, and further comprising at least four output leads wherein at least two output leads of the at least two output electrodes are disposed through each of the two split electrodes.

5. The apparatus of claim 1, wherein the at least two output electrodes comprise a first solid end cap electrode disposed at a first end of the chamber and a second solid end cap electrode disposed at an other end of the chamber, and further comprising at least two output leads wherein at least one output lead of the at least two output electrodes is disposed through each of the two solid end cap electrodes.

6. The apparatus of claim 1, further comprising a solenoid disposed around at least a portion of an external wall of the chamber, wherein an electric current passing through the solenoid induces a magnetic field within the chamber in an axial direction of the solenoid.

7. The apparatus of claim 1, wherein the radial magnetic field is caused by the induced plasma motion to align at least in part with magnetic fields caused by at least a portion of the at least two input electrodes, thereby inducing the second direct current within the chamber.

8. The apparatus of claim 1, further comprising a protective cover disposed between the solenoid and the chamber.

9. The apparatus of claim 1, wherein the at least two input electrodes comprise at least two direct current input electrodes.

10. The apparatus of claim 1, wherein the at least two helical magnetic coils produce a radial magnetic field in the at least two helical electrodes, causing a parallel current to be directly driven in the plasma.

11. A method comprising:
conveying through primary electrodes a first direct current into a chamber;
inducing motion in a plasma contained in the chamber based on the first direct current;
disposing externally to the chamber at least two helical magnetic coils configured to control a radial magnetic field through the primary electrodes; and
receiving a second direct current from the chamber based on the induced motion of the plasma and currents directly driven in the plasma.

12. The method of claim 11, further comprising generating an axial magnetic field through the plasma, and wherein inducing the motion in the plasma comprises distorting the magnetic field thereby generating the second direct current within the chamber.

13. The method of claim 11, wherein inducing motion in the plasma comprises providing the first direct current through at least two helical electrodes within the chamber.

14. The method of claim 11, wherein inducing motion comprises inducing a rotation sheared in an axial direction relative to the plasma, and wherein the second direct current is generated in the axial direction and flows out the chamber through secondary electrodes.

15. The method of claim 11, wherein conveying a first direct current comprises conveying with a first voltage, and further comprising conveying the second direct current with a second voltage.

16. The method of claim 11, wherein the inducing motion comprises generating a turbulent flow, a laminar flow, or a combination of turbulent and laminar flows.

17. The method of claim 11, wherein inducing motion comprises inducing a sheared flow in the plasma.

18. A system comprising a transformer configured to transform a first direct current to a second direct current, the transformer comprising:
a chamber configured to contain plasma;
at least two input electrodes disposed at least partially within the chamber and configured to direct the first direct current to induce motion in the plasma, thereby generating the second direct current in a secondary;
at least two helical magnetic coils external to the chamber and configured to control a radial magnetic field through the at least two input electrodes;
at least two output electrodes extending from the chamber and configured to conduct the second direct current from the chamber; and
an electrical delivery network electrically coupled to the at least two output electrodes and configured to conduct the second direct current to at least one remote location.

19. The system of claim 18, wherein each of the at least two input electrodes comprises at least one helically shaped portion.

20. The system of claim 18, wherein the chamber comprises an end cap and a split electrode disposed at opposite ends of the chamber, and wherein the split electrode conveys the second direct current from the chamber.

21. The system of claim 18, wherein the at least two input electrodes comprise at least two sets of electrodes equally spaced around the chamber.

22. The system of claim 18, wherein the transformer further comprises a solenoid disposed around at least a portion of an external wall of the chamber, and wherein an electric current passing through the solenoid induces a magnetic field within the chamber in an axial direction of the solenoid.

23. The system of claim 18, wherein the induced the motion in the plasma distorts the magnetic field thereby generating the second direct current within the chamber which exits the chamber through the at least two output electrodes.

24. The system of claim 18, wherein the helical magnetic coils are connected to a feedback system to control the radial magnetic field through the input electrode.

25. The system of claim 18, wherein the output and input electrodes are reversible in function, thereby converting a stepup transformer to a stepdown transformer or converting a stepdown transformer to a stepup transformer.

* * * * *